United States Patent [19]

Koyama

[11] 4,019,594
[45] Apr. 26, 1977

[54] MOTORIZED TWO-WHEELED VEHICLE CONSTRUCTION WITH POWER UNIT SWING SYSTEM

[75] Inventor: Mikihiro Koyama, Kawagoe, Japan

[73] Assignee: Honda Giken Kogyo Kabushiki Kaisha, Tokyo, Japan

[22] Filed: Sept. 3, 1975

[21] Appl. No.: 610,079

[30] Foreign Application Priority Data

Sept. 12, 1974  Japan .................... 49-104357

[52] U.S. Cl. .................... 180/33 A; 280/284
[51] Int. Cl.² .................... B62K 25/06
[58] Field of Search ............ 180/33 A, 33 R, 33 B, 180/29, 30, 32; 280/261, 284, 289

[56] References Cited

UNITED STATES PATENTS

| 2,705,154 | 3/1955  | Torre | 180/32  |
|-----------|---------|-------|---------|
| 2,755,873 | 7/1956  | Klaue | 180/32  |
| 2,756,071 | 7/1956  | Riva  | 280/284 |
| 3,354,976 | 11/1967 | Camps | 180/32  |

FOREIGN PATENTS OR APPLICATIONS

| 502,737 | 12/1954 | Italy          | 180/32   |
| 455,598 | 3/1950  | Italy          | 180/33 A |
| 290,170 | 7/1953  | Switzerland    | 180/32   |
| 275,675 | 10/1949 | Switzerland    | 180/32   |
| 800,488 | 8/1958  | United Kingdom | 180/32   |
| 680,082 | 10/1952 | United Kingdom | 180/32   |

*Primary Examiner*—Robert R. Song
*Assistant Examiner*—Jack D. Rubenstein

[57] ABSTRACT

A motorized two-wheeled vehicle construction having a power unit swing system comprising a vehicle body frame connecting a front head pipe to the lower surface of a seat unit for a driver, the rear side of the frame being provided with a curved lower elbow portion to which a power unit is pivotably or swingably attached. The power unit comprises an internal combustion engine and an integral power transmission mechanism extending rearwardly from the engine to one side of the rear wheel to drive the same. The power unit is swingably attached at its front end to the curved lower portion, and a shock absorber connects the rear portion of the power unit and the lower surface of the seat unit.

7 Claims, 4 Drawing Figures

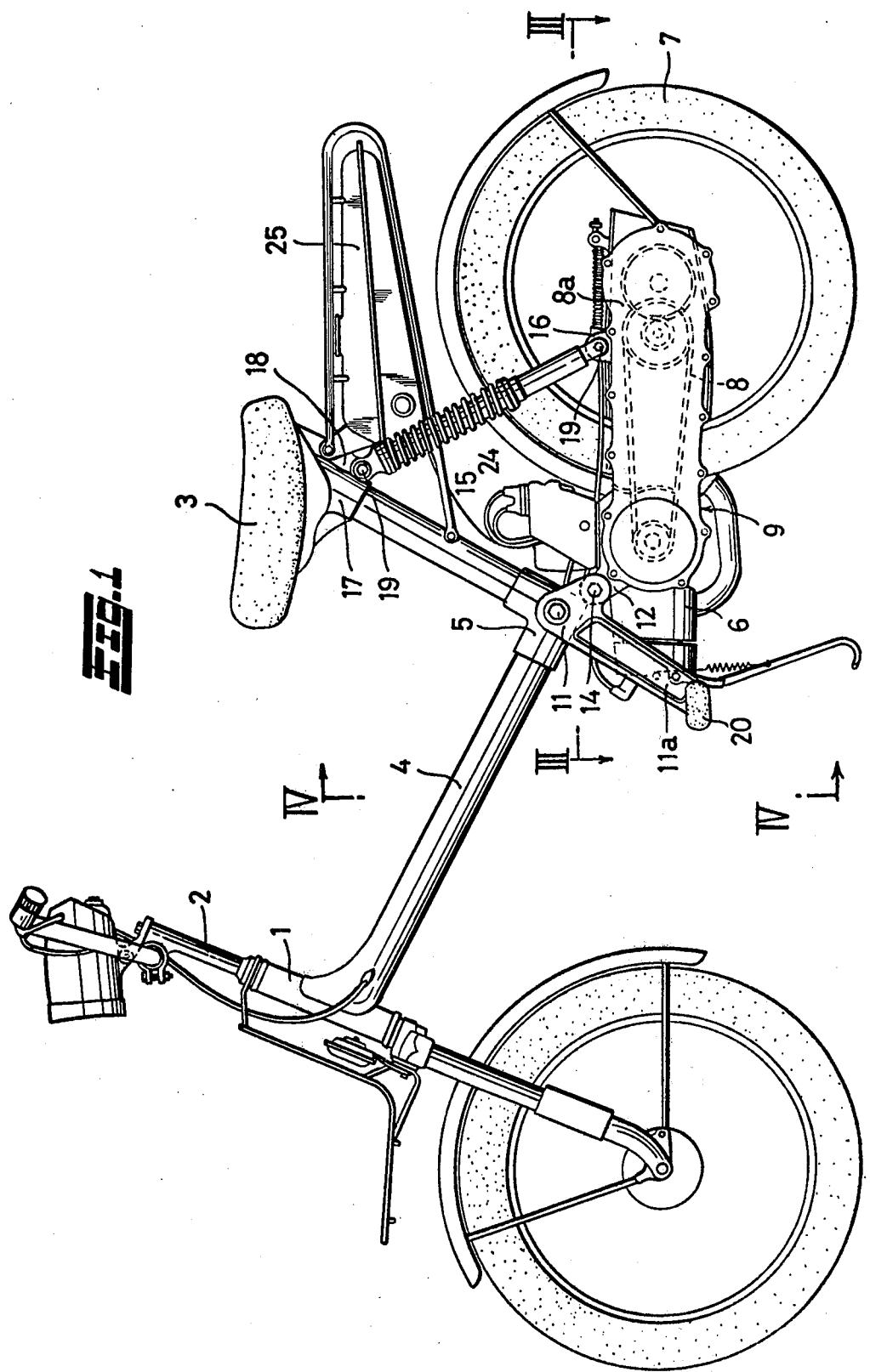

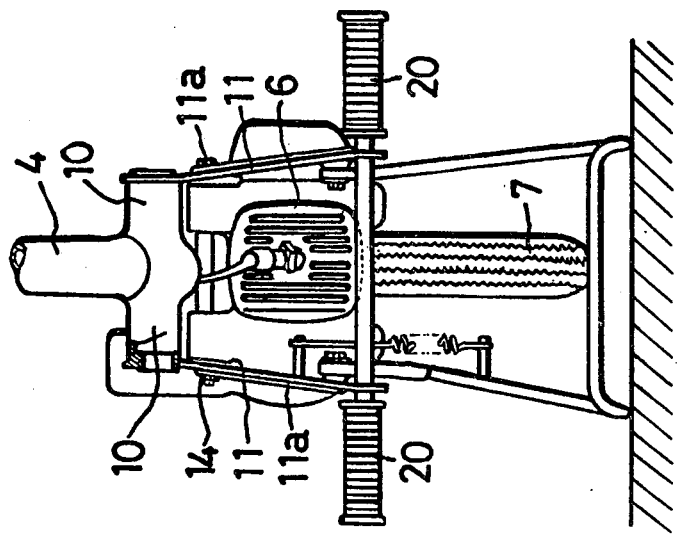
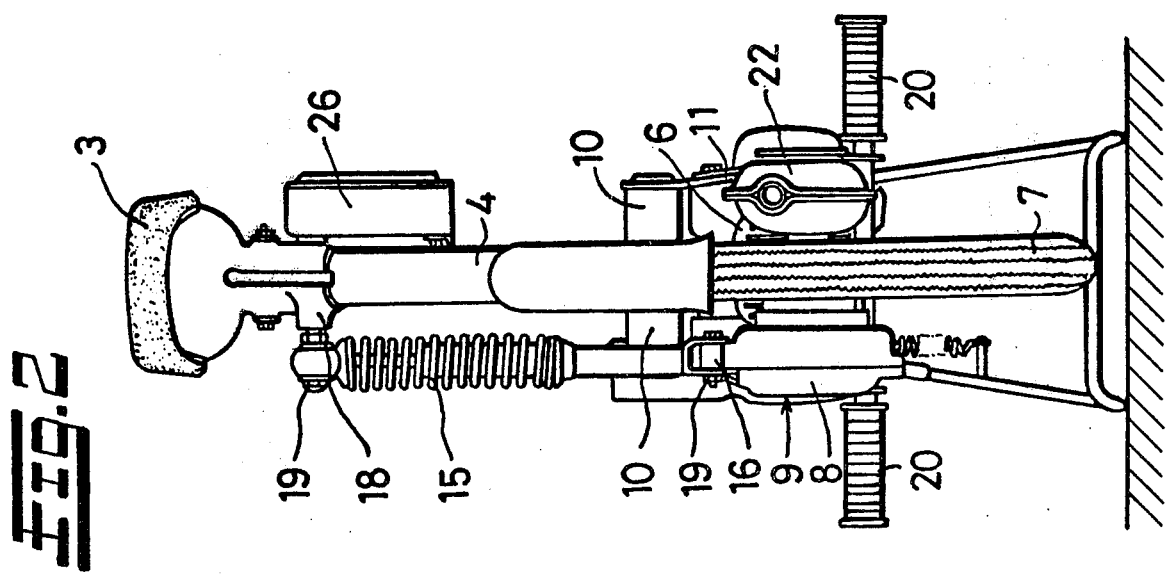

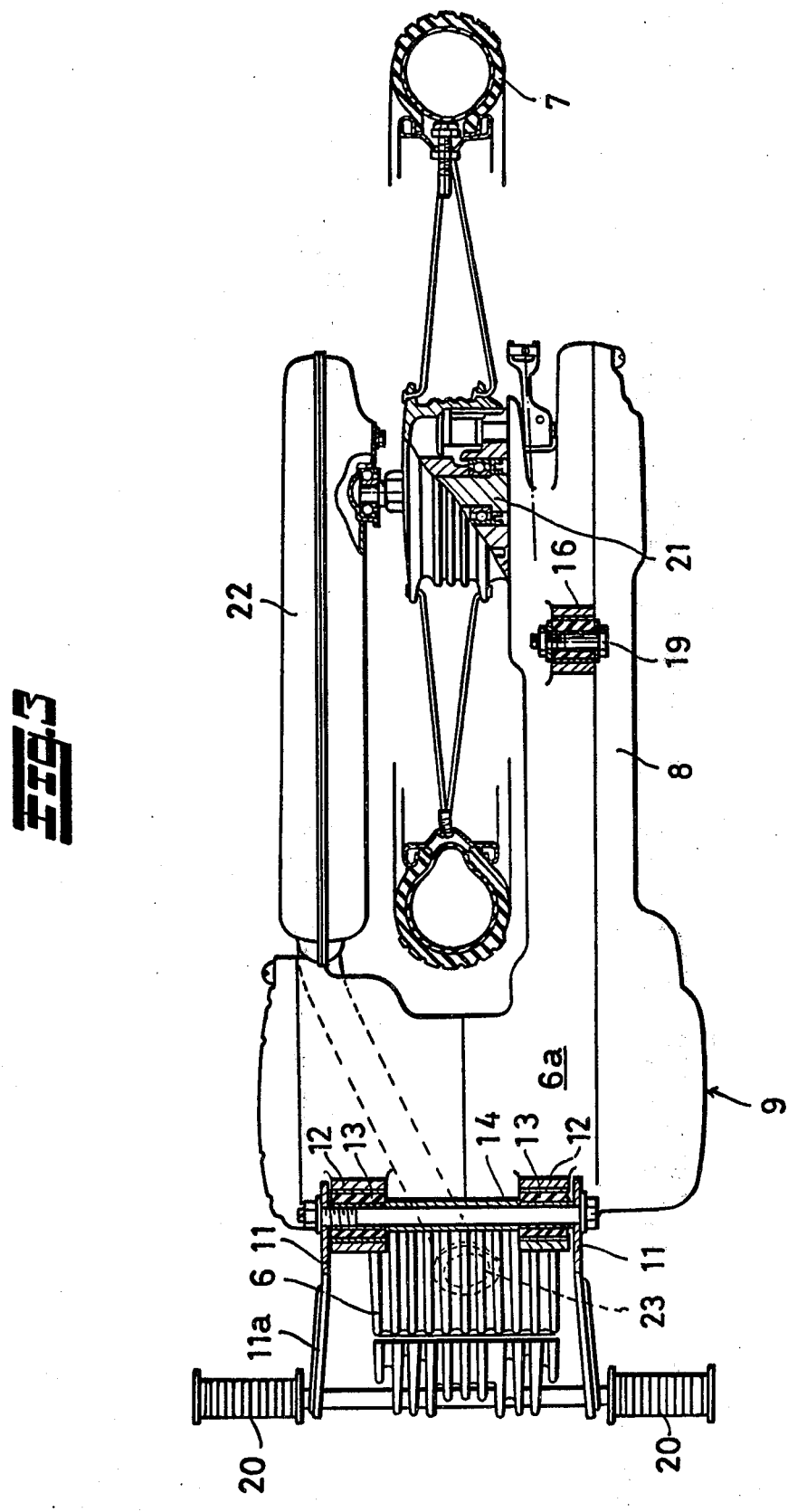

MOTORIZED TWO-WHEELED VEHICLE CONSTRUCTION WITH POWER UNIT SWING SYSTEM

FIELD OF THE INVENTION

This invention relates to the construction of a motorized two-wheeled vehicle having a power unit swing system comprising a swingable power unit including an internal combustion engine and a power transmission nechanism extending rearwards therefrom.

BACKGROUND AND SUMMARY OF THE INVENTION

Recently, it is desired in this kind of motorized two-wheeled vehicle to reduce the vehicle body frame thereof as much as possible so that the entire vehicle may be simplified in construction and lightened in weight.

An object of this invention is to provide a motorized twowheeled vehicle satisfying this requirement. According to this invention a frame of the vehicle body has a front end connected to a head pipe and a rear end connected to a seat assembly for a driver; a power unit which comprises an internal combustion engine and an integral transmission mechanism extending rearwardly from the engine adjacent one side of the rear wheel for drive thereof is pivotably attached at its front end to a curved lower portion of the frame, and a shock absorbing means is connected between the rear portion of the power unit and the seat assembly for the driver.

One embodiment of this invention will now be described with reference to the accompanying drawing.

BRIEF DESCRIPTION OF THE DRAWING

FIG. 1 is a side elevation view of one embodiment of this invention,
FIG. 2 is a rear side view thereof, and
FIGS. 3 and 4 are sectional views respectively taken along lines III—III and IV—IV in FIG. 1.

DETAILED DESCRIPTION

Referring to the drawings, numeral 1 denotes a head pipe at the front of the two-wheeled vehicle supporting a steering shaft 2. A frame portion 4 of the vehicle body of L-shape is mounted between the head pipe 1 and the lower surface of a driver's seat 3 to connect the same. A power unit 9 is swingably attached at its front end to a lower elbow portion 5 of the frame 4. The power unit comprises an internal combustion engine 6, and a power transmission mechanism 8 for driving rear wheel 7 extending integrally from engine 6 adjacent one side of the rear wheel 7.

More particularly, a pipe 10 is secured to the elbow portion 5 so as to project at right angles therefrom at both sides thereof, and arm members 11 extend downwards at opposite outer ends of the pipe 10, while arm members 12 project from both sides of the upper surface of the front portion of the power unit 9, that is, the upper surface of a crankcase 6a. The arm members 11 and 12 are interconnected through a shaft 14 with bushing members 13.

Additionally, a shock absorbing device 15 is interposed, on one side of the rear wheel 7, between the power transmission mechanism 8 on the rear portion of the power unit 9 and the lower surface of the seat 3. More specifcally, an arm member 16 projects from the upper surface of a casing 8a of the power transmission mechanism 8, and a projection 18 projects on one side from a holder member 17 on the lower surface of the seat 3, the shock absorbing device 15 being connected at its upper and lower ends to the members 16, 18 by means of respective bolts 19.

The arm members 11 supporting the front portion of the engine 6 have respective diverging arms 11a extending downwards, and respective steps 20 are attached to the lower end portions thereof. As seen in FIG. 1 the arms 11a extend generally in continuation of the leg of the frame 4 which supports the seat 3, whereas the other arms connected to shaft 14 are branched therefrom and substantially shorter.

Numeral 21 denotes the wheel axle of the rear wheel 7 projecting from the side surface at the rear of the casing 8a, numeral 22 denotes a muffler connected to an exhaust opening 23 of the engine 6 on the other side of the rear wheel 7, numeral 24 denotes a carburetor, numeral 25a fuel tank and numeral 26 denotes a battery casing.

According to this invention, the power unit itself is swingably attached at its front portion to the vehicle body frame and the shock absorbing means is interposed, on one side of the rear wheel, between the rear portion of the power unit itself and the lower surface of the seat, so that an additional frame for supporting the unit or additionally a frame extending rearwards from the seat for supporting the upper end of the shock absorbing means can be omitted and accordingly the vehicle body frame can be reduced as far as possible. The shock absorbing means may be sufficient with only a single unit on one side of the rear wheel. Thus the assembly of the motorized two-wheeled vehicle can be extremely simplified in construction and lightened in weight and can be obtained with sufficient strength at a lower price.

What is claimed is:
1. A motorized two-wheeled vehicle construction comprising front and rear wheels, a head pipe connected to the front wheel, a seat structure for a driver, said seat structure having a lower portion, a frame connecting said head pipe and said seat structure, said frame being L-shaped and including at the bend thereof an elbow portion, a power unit including an internal combustion engine and an integral power transmission drive mechanism extending from the engine adjacent one side of the rear wheel for drive thereof, means pivotably connecting said power unit to said frame at said elbow portion, said elbow portion including laterally extending pipe sections, said means which pivotally connects the power unit to the frame comprising depending arms connected to said pipe sections, said power unit being pivotally connected to said depending arms, steps mounted on said depending arms at the lower ends thereof, said depending arms has two branches, one a longer branch extending in continuation of one of the legs of said L-shaped frame and carrying a respective said step at the lower end thereof, the other branch beng a shorter branch pivotally connected to said power unit, and shock absorbing means connecting said power unit to said lower portion of the seat structure.

2. A construction as claimed in claim 1 wherein said shock absorbing mens is connected to said power transmission mechanism of said power unit.

3. A construction as claimed in claim 2 wherein said shock absorbing means comprises a single shock absorber unit disposed on said one side of the rear wheel.

4. A construction as claimed in claim 3 comprising a muffler connected to said engine and extending on the other side of said rear wheel.

5. A construction as claimed in claim 1 wherein said depending arms diverge downwardly fromm said pipe sections and flank said engine.

6. A construction as claimed in claim 1 wherein said means pivotably connecting the power unit to the frame further comprises a shaft extending through said shorter branches of the depending arms, bushings on said shaft, and arm members projecting from said power unit and mounted on said bushings.

7. A construction as claimed in claim 1 comprising a laterally extending pipe member joined to said arms and including portions projecting outwardly thereof to support said steps which include molded members mounted on the outwardly projecting portions of the pipe member, said pipe member being located forwardly and below the power unit.

* * * * *